United States Patent
Soto et al.

(10) Patent No.: US 11,194,208 B2
(45) Date of Patent: Dec. 7, 2021

(54) SWITCHABLE ONE-WAY MIRROR

(71) Applicant: ALPHAMICRON INCORPORATED, Kent, OH (US)

(72) Inventors: Pedro Coutino Soto, Kent, OH (US); Bahman Taheri, Shaker Heights, OH (US)

(73) Assignee: ALPHAMICRON INCORPORATED, Kent, OH (US)

( * ) Notice: Subject to any disclaimer, the term of this patent is extended or adjusted under 35 U.S.C. 154(b) by 0 days.

(21) Appl. No.: 16/960,920

(22) PCT Filed: Jan. 10, 2019

(86) PCT No.: PCT/US2019/012968
§ 371 (c)(1),
(2) Date: Jul. 9, 2020

(87) PCT Pub. No.: WO2019/140035
PCT Pub. Date: Jul. 18, 2019

(65) Prior Publication Data
US 2020/0333644 A1    Oct. 22, 2020

Related U.S. Application Data

(60) Provisional application No. 62/615,517, filed on Jan. 10, 2018.

(51) Int. Cl.
*G02F 1/137* (2006.01)
*G02F 1/1335* (2006.01)
(Continued)

(52) U.S. Cl.
CPC ........ *G02F 1/137* (2013.01); *G02F 1/133528* (2013.01); *G02F 1/157* (2013.01);
(Continued)

(58) Field of Classification Search
CPC ............... G02F 1/163; G02F 1/133553; G02F 2203/02; G02F 2203/09
See application file for complete search history.

(56) References Cited

U.S. PATENT DOCUMENTS

| | | |
|---|---|---|
| 3,499,112 A | 3/1970 | Heilmeier et al. |
| 3,551,026 A | 12/1970 | Heilmeier |

(Continued)

FOREIGN PATENT DOCUMENTS

| | | | | |
|---|---|---|---|---|
| JP | 62-118316 | 11/1985 | ............... | G02C 7/10 |
| JP | 11-160659 | 6/1999 | ............... | G02C 7/10 |

(Continued)

OTHER PUBLICATIONS

YouTube video clip entitled "MAXICON—Smart Glass—Conference Room Application" uploaded on Aug. 27, 2014 by user "MAXICON". Retrieved from Internet: <https://www.youtube.com/watch?v=gCSfMDK_jqk> (Year: 2014).*

(Continued)

*Primary Examiner* — Edmond C Lau
*Assistant Examiner* — Jonathan Y Jung
(74) *Attorney, Agent, or Firm* — Vorys, Sater, Seymour and Pease LLP; William E. Ryan

(57) ABSTRACT

A switchable one-way mirror device dividing first and second spaces includes a switchable electro-optic layer facing the second space and configured to be electronically switchable between a transmissive state and one or more opaque states, and a partial reflector incorporated within or adjacent the switchable electro-optic layer and facing the first space and configured to partially reflect light. The switchable one-way mirror partially transmits a first light going from the first space to the second space, and a second light going from the second space to the first space. When the switchable electro-optic layer is in an opaque state, (Continued)

transmission of light through the device is reduced thereby changing the ratio between the transmission of the second light to the first space and the reflection of the first light by the partial reflector resulting in reduced visibility of the second space by a viewer in the first space.

18 Claims, 5 Drawing Sheets

(51) Int. Cl.
    *G02F 1/157* (2006.01)
    *G02F 1/163* (2006.01)
(52) U.S. Cl.
    CPC .......... *G02F 1/163* (2013.01); *G02F 2203/02* (2013.01); *G02F 2203/09* (2013.01)

(56) References Cited

U.S. PATENT DOCUMENTS

| | | | |
|---|---|---|---|
| 3,864,022 A | 2/1975 | Moriyama et al. | 350/160 LC |
| 4,530,572 A | 6/1985 | Huffman | 350/346 |
| 4,664,479 A | 5/1987 | Hiroshi | 350/338 |
| 4,919,520 A | 4/1990 | Okada et al. | 350/331 T |
| 5,172,256 A | 12/1992 | Sethofer et al. | 359/77 |
| 5,327,271 A | 7/1994 | Takeuchi et al. | 359/75 |
| 5,343,313 A | 8/1994 | Fergason | 359/83 |
| 5,453,863 A | 9/1995 | West et al. | 359/91 |
| 5,943,104 A | 8/1999 | Moddel et al. | 349/13 |
| 6,239,778 B1 | 5/2001 | Palffy-Muhoray et al. | 345/87 |
| 6,493,128 B1 | 12/2002 | Agrawal et al. | 359/265 |
| 6,674,504 B1 | 1/2004 | Li et al. | 349/169 |
| 6,753,047 B1 | 6/2004 | Athey | 428/1.21 |
| 6,927,765 B1 | 8/2005 | Masazumi et al. | 345/204 |
| 7,356,969 B1 | 4/2008 | Yurth et al. | 52/171.3 |
| 7,550,094 B2 | 6/2009 | Jeng et al. | 252/299.01 |
| 7,754,295 B2 | 7/2010 | Chari et al. | 428/1.1 |
| 8,068,199 B2 | 11/2011 | Ishitani | 349/117 |
| 8,139,290 B2 | 3/2012 | Choi | 359/460 |
| 9,116,370 B2 | 8/2015 | Taheri et al. | G02F 1/13306 |
| 2002/0154379 A1* | 10/2002 | Tonar | F21S 45/47 359/267 |
| 2004/0070699 A1 | 4/2004 | Miyachi et al. | 349/43 |
| 2004/0125305 A1 | 7/2004 | Nishi et al. | 349/141 |
| 2005/0007506 A1 | 1/2005 | Faris et al. | 349/16 |
| 2006/0152649 A1 | 7/2006 | Yanagida | 349/61 |
| 2007/0146910 A1 | 6/2007 | Duston et al. | 359/834 |
| 2007/0151600 A1 | 7/2007 | Li et al. | 136/263 |
| 2007/0153354 A1 | 7/2007 | Duston et al. | 359/245 |
| 2007/0268427 A1 | 11/2007 | Uehara | 349/62 |
| 2008/0013000 A1 | 1/2008 | Park et al. | 349/13 |
| 2008/0231785 A1 | 9/2008 | Harada | 349/123 |
| 2008/0246900 A1 | 10/2008 | Taheri et al. | 349/58 |
| 2009/0027872 A1 | 1/2009 | Debije et al. | 362/84 |
| 2009/0109393 A1* | 4/2009 | Borenstein | G02F 1/13 349/195 |
| 2009/0114211 A1 | 5/2009 | Homyk et al. | 126/578 |
| 2009/0204207 A1 | 8/2009 | Blum et al. | 623/4.1 |
| 2010/0024805 A1 | 2/2010 | Raymond et al. | 126/683 |
| 2010/0039595 A1 | 2/2010 | Hayashi et al. | 349/123 |
| 2010/0225837 A1 | 9/2010 | Seki et al. | 349/25 |
| 2012/0038841 A1 | 2/2012 | Taheri et al. | 349/25 |
| 2014/0320776 A1* | 10/2014 | Taheri | G02F 1/0045 349/16 |
| 2015/0323825 A1 | 11/2015 | Taheri et al. | G02F 1/13737 |
| 2016/0019868 A1 | 1/2016 | Park et al. | G09G 5/391 |
| 2016/0070132 A1* | 3/2016 | Soto | G02F 1/13476 349/193 |
| 2016/0124283 A1 | 5/2016 | Brown et al. | G02F 1/163 |
| 2017/0235165 A1* | 8/2017 | Yamada | G02F 1/13439 349/33 |
| 2019/0036480 A1* | 1/2019 | Barr | E06B 3/66 |

FOREIGN PATENT DOCUMENTS

| | | | |
|---|---|---|---|
| WO | WO 00/27771 | 5/2000 | C03C 17/34 |
| WO | WO 2006/088369 A2 | 8/2006 | H01L 31/055 |
| WO | WO 2008/075286 A2 | 6/2008 | F24J 2/40 |
| WO | WO 2008/155767 A2 | 12/2008 | G02B 5/20 |
| WO | WO 2009/141295 A1 | 11/2009 | H01L 31/0256 |

OTHER PUBLICATIONS

International Search Report dated Apr. 12, 2019 in related application No. PCT/US2019/012968.
Written Opinion dated Apr. 12, 2019 in related application No. PCT/US2019/012968.
Kai et al.; *Pattern Forming Instability in Homeotropically Aligned Liquid Crystals*; The Journal of Physical Chemistry 100; Aug. 15, 1996; pp. 1-10.
Kai et al.; *Successive Transitions in Electrohydrodynamic Instabilities of Nematics*; Progress of Theoretical Physics Supplement, No. 64; 1978; pp. 1-32.
Kai et al.; *Pattern Dynamics in the Electrohydrodynamics of Nematic Liquid Crystals*; Progress of Theoretical Physics Supplement No. 99; 1989; pp. 1-35.
Heilmeier et al.; *Dynamic Scattering in Nematic Liquid Crystals*; Applied Physics Letters; vol. 13, No. 1; Jun. 10, 1968; pp. 1-2.
Heilmeier et al.; *Dynamic Scattering: A New Electrooptic Effect in Certain Classes of Nematic Liquid Crystals*; Proceedings of the IEEE; vol. 56, No. 7; Jul. 7, 1968; pp. 1-13.
Fowles; *Introduction to Modern Optics*; Professor of Physics; University of Utah; Second Edition; Dover Publications, Inc.; 1975, New York; 3 pgs.
Hecht; *Optics* 4th Edition; Adelphi University; A.R. Ganesan; India Institute of Technology, Madras; Pearson Education, Inc.; 2002; 11 pages.
*MIT Brainstorms Alternative Energies*; Photonics Spectra; Oct. 2008; pp. 46-47.
Currie et al.; *High-Efficiency Organic Solar Concentrators for Photovoltaics*; Science; vol. 321; Jul. 11, 2008; pp. 226-228.
Thomson; *MIT opens new 'window' on solar energy*; Jul. 10, 2008; http://web.mit.edu/newsoffice/2008/solarcells-0710.html.
Van Sark; *Luminescent Solar Concentrators—A review of recent results*; Optics Express; Optical Society of America; vol. 16, No. 26; Dec. 22, 2008; pp. 21773-21792.

* cited by examiner

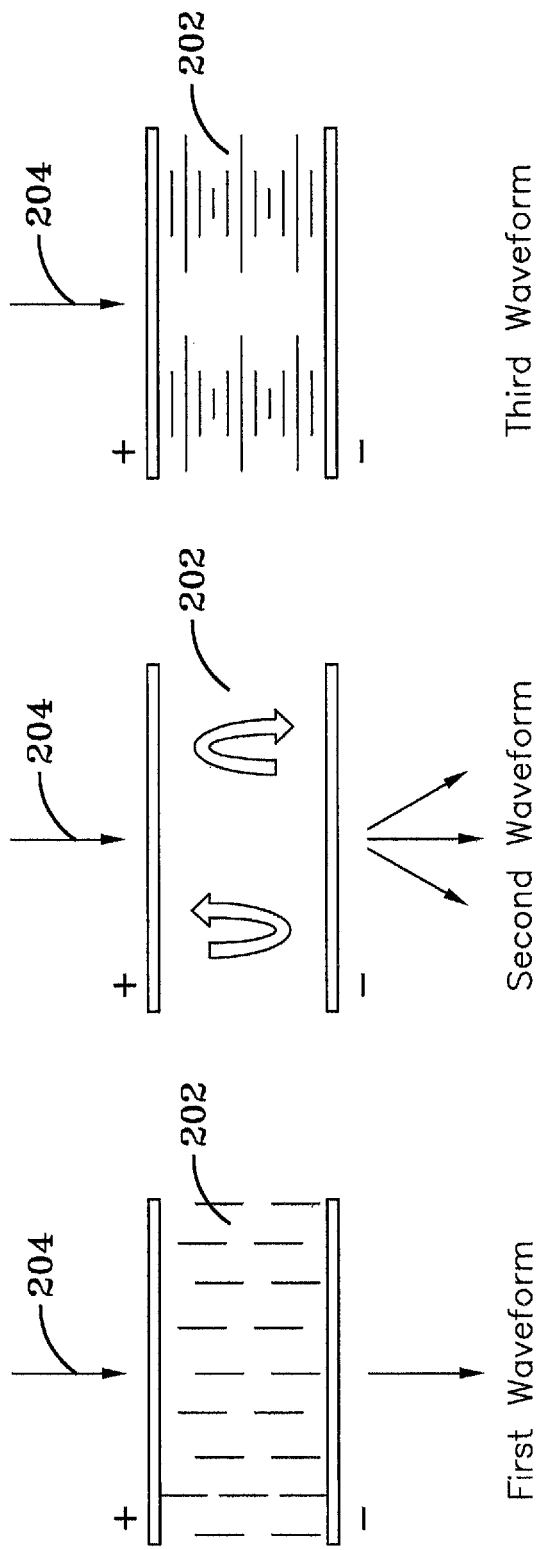

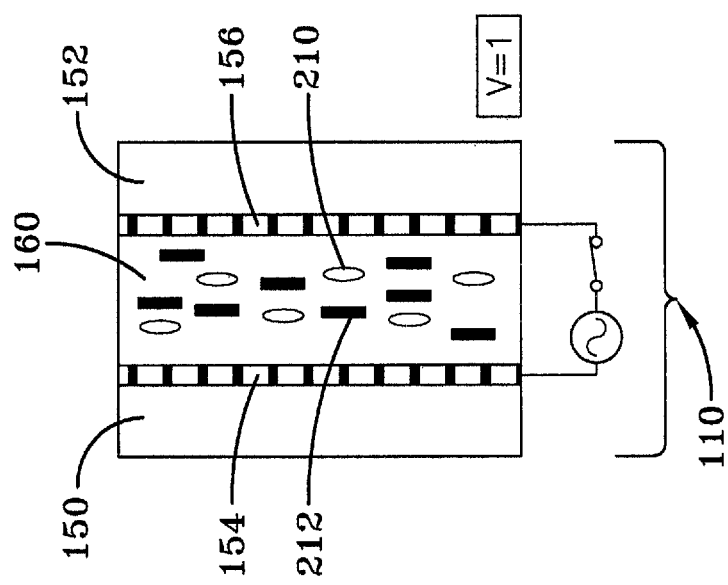
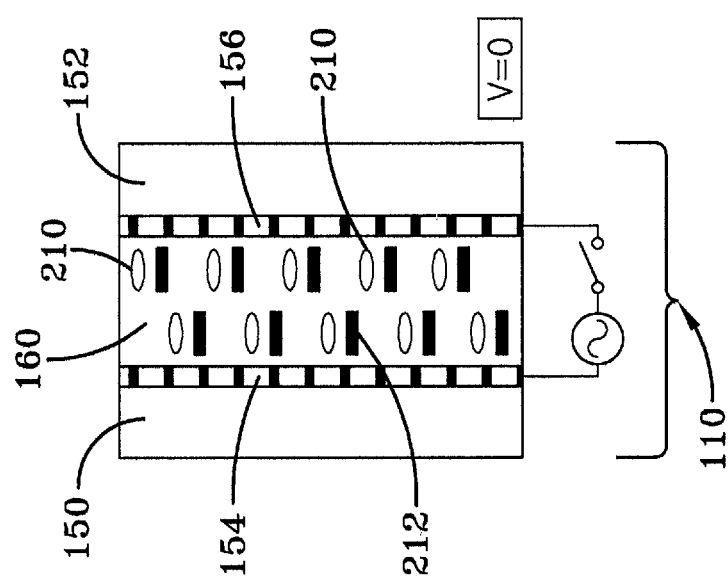

SWITCHABLE ONE-WAY MIRROR

CROSS-REFERENCE TO RELATED APPLICATIONS

This application is a § 371 application of International patent application number PCT/US2019/012968 filed Jan. 10, 2019, which claims the benefit of U.S. provisional application No. 62/615,517 filed Jan. 10, 2018.

BACKGROUND

It is an unfortunate fact that school and other random shootings are becoming an increasing reality around the country. The safety of the children and adults in such a situation is of paramount importance. The current protocol requires the people inside a room (e.g. classroom) to physically block the windows looking into the room to obscure visibility from first the room (e.g. corridor). This process has three disadvantages. First, it requires presence of an adult capable of achieving this. Second, it takes time when time is of the essence. Third, it blocks views on both sides so people inside a classroom will have no visibility of the outside.

One-way mirrors are commonly used in law enforcement or situations where asymmetric viewing is desired, They rely on the difference in lighting condition between two areas. Inside a normal building, however, lighting conditions inside and outside the rooms are usually the same and as such, traditional systems do not work.

The aim of this invention is to provide a device that can improve the security features of a window by providing a switchable film that can be switched to reduce transmission of light, thereby turning a regular window into a "one-way mirror". The one-way mirror functionality can be activated or adapted to various lighting conditions, including between two interior spaces with about the same type and amount of lighting. For example, one way to achieve this is to provide a switchable one-way mirror device that can be installed on an interior window separating a room (such as a classroom) from an environment outside the room (such as a hallway outside the classroom) where both have more or less the same lighting conditions (e.g. about the same amount of lighting by interior light fixtures). In such a situation, it would be desirable to be able to switch the window from a normal transmissive state to one where it acts as a one-way mirror, making it difficult for a person (e.g. an active shooter) standing outside the classroom to see the inside of the classroom.

Other applications are possible, turning any window in a building (inside or outside) or a car (window or sunroof), etc. into a switchable one-way mirror. When faced with a dangerous situation, the switchable one-way mirror can be activated by a person (either by flipping a switch or remotely), thus making it very difficult for the persons outside a space, e.g. outside a classroom, to see the inside of the space, or classroom, while still providing some visibility to the person inside the space. The system has a number of advantages, such as allowing one person to activate a number of windows at the same time, instantly securing the entire building; the ability to allow anyone, including a child, to activate the window; and remote activation, ensuring that no one is exposed to danger.

SUMMARY OF INVENTION

Disclosed herein is a switchable one-way mirror device 100 dividing a first space 102 and an second space 104, said mirror comprising: an first surface 106 facing the first space 102 and an second surface 108 facing the second space 104, a switchable electro-optic layer 110 on or facing the second space configured to be switchable between a transmissive state and an opaque state, and a partial reflector 112 on or facing the first space configured to partially transmit light and partially reflect light, wherein the mirror is configured to partially transmit and partially reflect light, e.g. a first light L1, 120 going from the first space to the second space, and a second light L2, 130 going from the second space to the first space.

The device is operated by application of a one or more voltages from a power source, controlled by a controller. When the switchable electro-optic layer is in the transmissive state, the first light L1 and the second light L2 are transmitted about equally through the mirror. When the switchable electro-optic layer is in the opaque state, it partially reduces light going through it, thereby changing the ratio between the transmission of the second light 130 to the first space 102 and the reflection of the first light 120 by the partial reflector 112 back into the first space. This results in reduced visibility of the second space 104 from the viewpoint of a viewer in the first space 102.

In one embodiment, the effect of a partial reduction in transmission in the electro-optic layer 110 is that the reflection of first light, 124, is about the same amount or more than the amount of transmission of the second light 132. In other embodiments, the amount of first light 124 that is reflected may be less than the amount of the second light 132 being transmitted, but the overall effect is that a person standing in the first space will have reduced visibility of anything in the second space.

In some examples, the first space is the outside of a room (e.g. classroom), a car, a building, etc. and the second space is the inside of the room, car, building, etc.

In other examples, where the one-way mirror device is implemented on a virtual reality, augmented reality, mixed reality, or other such device, the first space is between the viewer's eye and the mirror device, and the second space is the outside environment. In this embodiment, operation of the electro-optic layer to vary transmission of light varies the visibility of objects in the second space (or outside environment) relative to the reflected image projected, and reflected to be in front of the eye, by an image-projector or other similar apparatus.

In one example of the device, the switchable electro-optic layer is in the transmissive state when OFF and in a tinted or opaque state when turned ON by application of a voltage.

In another example of the device, the switchable electro-optic layer is in an opaque state when OFF and in the transmissive state when turned ON by application of a voltage.

The switchable electro-optic layer may include an electrochromic, a liquid crystal, or other electro-optically active mixture.

The switchable electro-optic layer may include a configuration that is light absorptive, light reflective, light scattering configuration or a combination of thereof.

The liquid crystal layer may include a nematic, chiral-nematic, guest-host, twisted nematic, STN, polymer stabilized, polymer dispersed (PDLC), nematic curvilinear aligned phase (NCAP) or a combination thereof.

The switchable electro-optic layer may include a cell, or plurality of cells, with either glass or plastic substrates.

In some embodiments, the electro-optic layer or the one-way mirror device as a whole has multiple pixels, each of which can be independently operated (activated) to alter the relative visibility of the second space.

The opacity/tint of the electrooptic device may be continuously altered to optimize the ratio between the reflected first light 124 and the transmitted second light 132.

In some examples, the device may include a polarizer, or its function may be polarization based. In other embodiments, the device does not use polarizers and/or its function is non-polarization based.

The one-way mirror device described herein can be applied to a surface of a window, or other see-through barrier (e.g. visor, AR/VR/MR device, near-eye display, HMD, etc.) between the first and second spaces, or it may be an integral part of the window, or the aforementioned barrier.

The device can be controlled manually, automatically, remotely or be programmed to activate in response to certain events. In some examples, the device is voice activated.

BRIEF DESCRIPTION OF THE DRAWINGS

These and other features and advantages of the present invention will become better understood with regard to the following description, appended claims, and accompanying drawings wherein:

FIGS. 3A-C are schematic diagrams of an example of a liquid crystal molecule orientation during various states: (A) transmissive state, (B) opaque/scattering state, and (C) opaque/absorptive state.

FIG. 5 is a schematic diagram of an example of a guest-host liquid crystal cell suitable for use in the one-way mirror device.

DETAILED DESCRIPTION

Figure 1A:
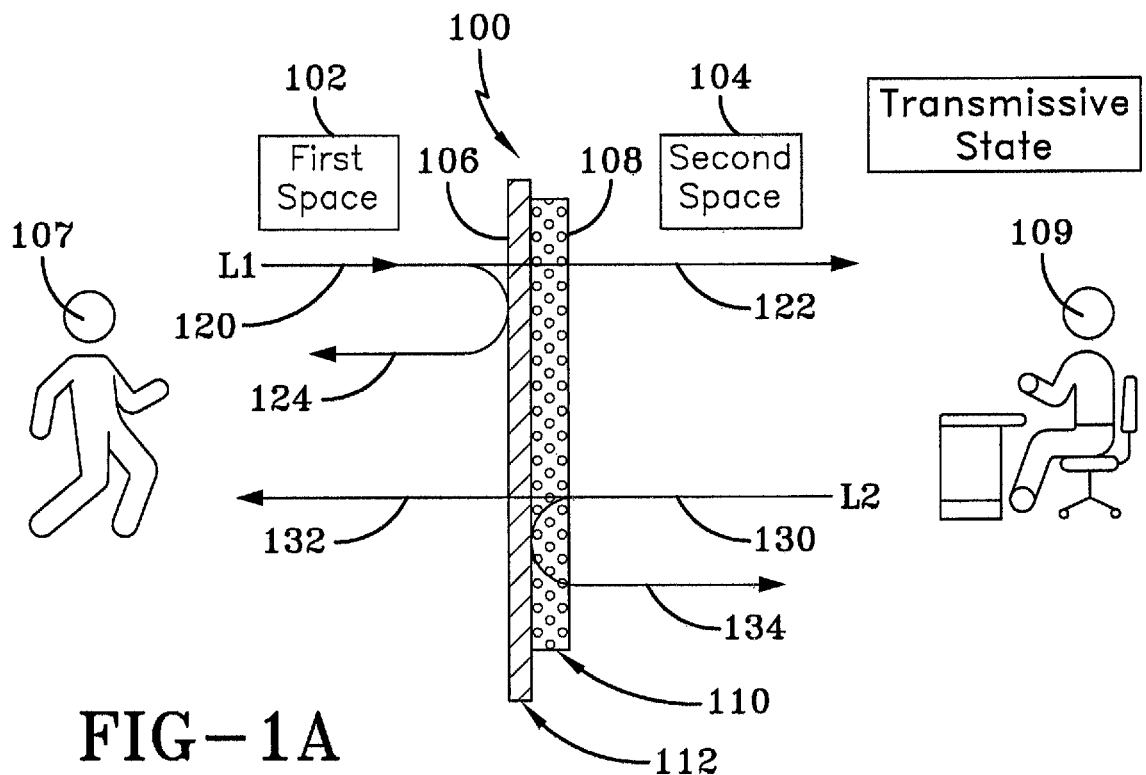
FIGS. 1A and 1B are schematic views of one embodiment of a one-way mirror of the invention.

The structures shown schematically in the drawings have parts that are examples of the elements recited in the apparatus claims. The illustrated structures thus include examples of how a person of ordinary skill in the art can make and use the claimed invention. It is described here to meet the enablement and best mode requirements of the patent statute without imposing limitations that are not recited in the claims. Further, this Detailed Description merely describes exemplary embodiments of the invention and is not intended to limit the scope of the claims in any way.

The present invention provides a switchable one-way mirror device which can be switched between a transmissive (i.e. more transparent or see-through) state and one or more opaque (one-way mirror) state by application (or removal) of a voltage.

Definitions

One-way mirror means a device that asymmetrically reflects light on one side more than it reflects light from the other side. A switchable one-way mirror device refers to a device that can be switched between a more transmissive state and a one-way mirror state in response to a change in applied voltage (see below).

Switchable Electro-optic layer or Electro-optic layer are used interchangeably and refer to a switchable layer that can be activated by application of a voltage to switch between states. The electro-optic layer has a transmission state, and one or more opaque states where it reduces the transmission of light going through it, thereby variably controlling light transmission. In some embodiments, the electro-optic layer can have two states: a) maximally transmissive and b) maximally opaque (i.e. minimally transmissive). In other embodiments, in addition to the maximally and minimally transmissive states, the electro-optic layer may have one or more intermediate opaque states where it reduces the transmission of light to an amount that is intermediate between its maximum and minimum transmissive states.

Electro-optic layers contemplated herein may include liquid crystal (LC), electrochromic (EC), SPD (suspension particle device), PDLC (polymer dispersed liquid crystal), twisted nematic (TN), super-twisted nematic (STN), polymer stabilized liquid crystal, dynamic scattering and the like. In some embodiments, the electro-optic layer comprises a guest-host LC.

Partial, as used herein, refers to any number between 1% and 99%, including 1% and 99%. Thus, a "partial reduction" in light transmission refers to a reduction in light transmission of anywhere from 1% to 99% through a device.

Partial reflector is a reflector that only partially reflects light, allowing a percentage of light to pass through it.

Opaque state refers to a state where the electro-optical device allows partial transmission of light by either partially absorbing light (light absorptive), scattering light (light scattering), reflecting light (light reflective), or a combination of the above (as shown, for example, in FIG. 3), i.e. having separate, or simultaneous, scattering and absorptive states in addition to the transmissive state.

Transmissive state refers to a state where the electro-optic device has its maximum transmissivity.

Figure 1B:
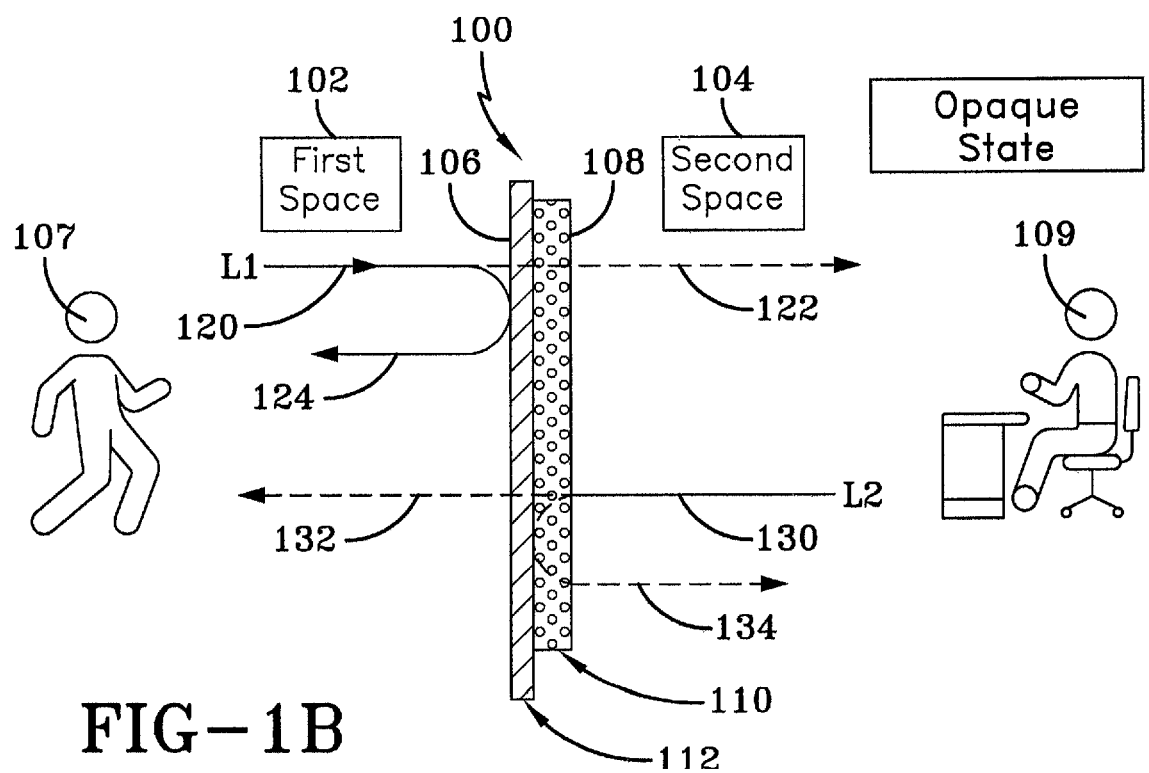

Referring now to FIGS. 1A and 1B, we describe herein an example of a switchable one-way mirror device 100 that may be applied to or be an integrated part of a window (not shown) that separates a first space 102 from a second space 104. In the embodiment depicted, the first space is outside a room (e.g. a corridor outside a classroom) and the second space is inside the room (e.g. inside a classroom). Also, in this embodiment, it is assumed that both the first and second spaces have about the same amount of lighting, but it will be appreciated that the lighting conditions do not have to be identical and may be different.

As seen in FIG. 1, the device has a first surface 106 facing the first space 102 that is viewable by a first viewer 107 (such as a person standing outside a classroom) and a second surface 108 facing the second space 104 that is viewable by a second viewer 109 (such as a student in a classroom). The one-way mirror 100 has a switchable electro-optic layer 110 facing the second space 104 and a partial reflector 112 facing the first space 102. The elements 110 and 112 may be adjacent each other, or may be separated by a space or other layers, or may be integrated into one integral device (see FIG. 2B). In all these examples, the partial reflector 112 is placed on one side of the electro-optic layer 110 which when opaque, results in an asymmetry in transmitted light vs. reflected light between the two sides of the device.

The electro-optic layer 110 is switchable between a transmissive state and one or more opaque states. In the transmissive state, the electro-optic layer will have maximal transmissivity. In the opaque state, the electro-optic layer will partially reduce the transmission of light by absorbing and/or scattering and/or reflecting light. There can be one or more opaque states with varying levels of reduction of light transmission.

The partial reflector 112 is configured to partially transmit and partially reflect light. Such partial reflectors can be made by coating or covering one side of a transparent glass or plastic with a reflective material, such as metal coating (aluminum, silver, chrome, Tin Oxide etc.) or a dielectric stack or the like, so that the transmission rate or reflection rate may be controlled, if necessary, to be higher than a reflection from an uncoated glass. For example, a transmission rate of 95%, 90%, 85%, 80%, 70%, 60%, 50%, 40%, 30%, 20% or any number in between, and a reflection rate of 5%, 10%, 15%, 20%, 30%, 40%, 50%, 60%, 70% or 80%, or any number in between, can be achieved. It will be appreciated that the partial reflector may be adjusted according to the location of the mirror, i.e., whether the mirror is installed between two interior rooms or between an interior room and exterior space (which will have very different lighting conditions). In the case of the partial reflector being worn by a user in a near-eye display situation (e.g. AR/VR/MR or other near-eye display devices), a type of partial reflector can be used that is suitable for the intended use of the device as a whole.

Referring to FIGS. 1A and B, operation of the mirror will be described in the embodiment where it is used inside a building, but it will be appreciated that the essential elements and fundamental operation of the device is the same whether used in a window of a building, or in a car, or in an AR/VR/MR device, or in a near-eye display, etc.

When a first light 120 (L1) that is going from the first space 102 to the second space 104 encounters the switchable mirror 100, it first encounters the partial reflector 112, then the electro-optic layer 110. Light 120 is partially transmitted through the device as $L1_{Trans}$ (122) and partially reflected as $L1_{Ref}$ (124). A second light 130 that is going from the second space 104 to the first space 102 first encounters the electro-optic layer 110 and then the partial reflector 112. Light 130 (L2) is also partially transmitted through the mirror as $L2_{Trans}$ (132) and partially reflected as $L2_{Ref}$ (134). (See FIG. 1A)

The optics of the one-way mirror device is designed so that the reflections are asymmetric. So, when the electro-optic layer is in a transmissive state, the first or outside light 120 (L1) is partially reflected by the partial reflector 112 and the remainder passes through the maximally transmissive electro-optic layer 110 to reach the second space 104. Similarly, the inside or second light 130 (L2) experiences maximal transmission through the electro-optic layer 110 and is then either reflected 134 by the partial reflector 112 or transmitted 132 to the first space. See FIG. 1A. Therefore, the transmission of light from first to second is substantially the same as the transmission of light from second to first: $L1_{Trans} \approx L2_{Trans}$. Therefore, assuming the lighting conditions of the two spaces 102, 104 are about the same, i.e. 120≈130, then 122≈132.

However, because of the effect of electro-optic layer on the incident light, the amount of light reflected by the partial reflector 112 will be different. This difference is directly related to the transmissivity of the electro-optic layer. When the switchable electro-optic layer is in a maximally opaque state, as shown in FIG. 1B, the electro-optic layer 110 will be minimally transmissive and will not allow some of the light from either space to reach the other. In this case, the reflected light 124 and 134 will be substantially different in magnitude.

For example, in the embodiment where the switchable electro-optic layer is absorptive, it will absorb light of either direction such that less second light (L2, 130) will be allowed to reach the partial reflector 112 or the first space, and similarly, less first light (L1, 120) will be allowed to go through to the second space.

In other embodiments, e.g. in the case of the switchable electro-optic layer that is light scattering, a similar principle applies. By scattering or reflecting some of the light, the electro-optic layer effectively reduces the transmission of light through the layer.

The important parameter is the ratio between the reflected light 124 and the transmitted light 132 reaching the eye of a viewer in the first space. As seen in FIG. 1B, the reflection of first light L1 (120) impinging the partial reflector 112 remains the same and unaffected by the electro-optic layer. In this situation, the amount of reflected light from L1 or $L1_{Ref}$(124) can be designed to be equal to or greater than the amount of second light L2 (130) transmitted to the first space or $L2_{Trans}$ (132). In other words, the first light 120 is reflected off of the partial reflector 112 about the same amount as before, whereas the second light 130 is mostly absorbed/scattered, etc. by the electro-optic layer (which is now in an opaque state) and so very little light is transmitted through. Therefore, the amount of reflected first light or $L1_{Ref}$(124) is equal or greater than the amount of transmitted second light or $L2_{Trans}$ (132), i.e.:

$$L1_{Ref} \geq L2_{Trans}$$

or 124≥132.

Because of the relative inequality of reflected vs. transmitted light, the device, when in an opaque state, acts as a one-way mirror so that viewer 107 in the first space will preferentially see his own reflection (124) and not see the content of the second space because relatively less second light (132) is reaching him.

It is possible for the one-way mirror to operate as such even where the ratio between the transmitted and reflected light is somewhat reversed. For example, in other embodiments, the amount of first light that is reflected (124) may be less than the amount of the second light being transmitted (132), i.e. 124<132, but the overall effect is still such that a person 107 standing in the first space 102 will have reduced visibility of anything in the second space 104.

It will be appreciated that while one example of the one-way mirror has been described in a school setting, it can be used in any building, vehicle, etc. and any situation where it is desirable to have a switchable one-way mirror that can be switched between a mostly transmissive state and one or more one-way mirror states.

Figure 2A:
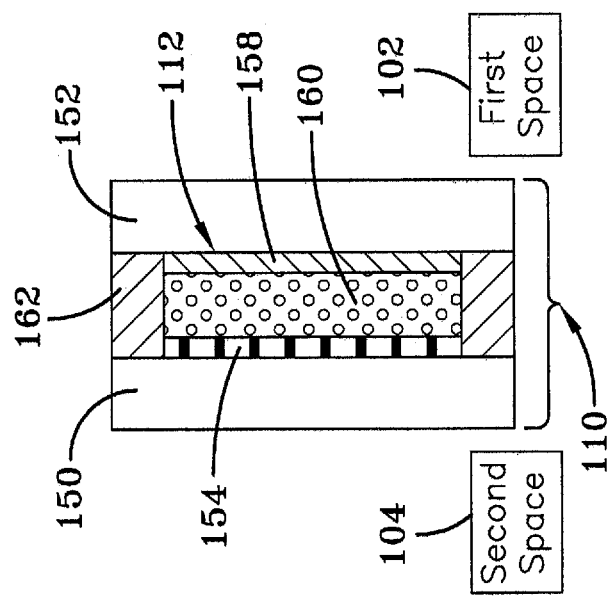
FIGS. 2A and 2B are cross-sectional representations of the various layers in different embodiments of the one-way mirror.
Figure 2B:
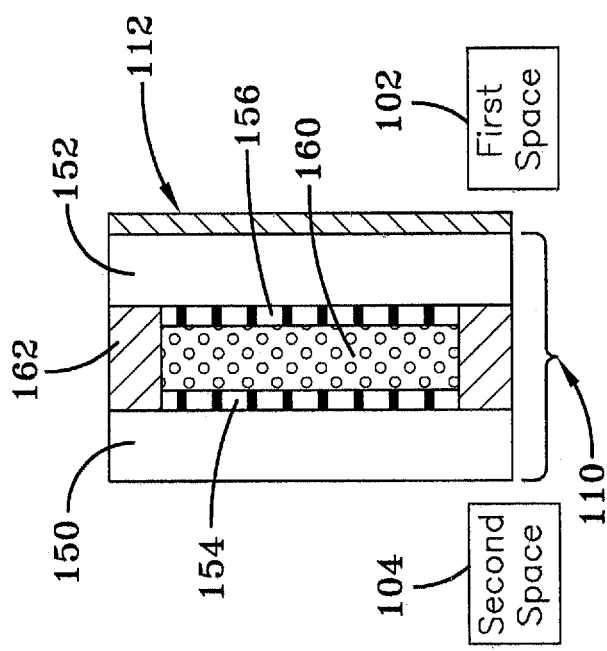

FIGS. 2A and 2B show examples of two different embodiments from several different arrangements of the electro-optical layer 110 and the partial reflector 112. In FIG. 2A, the electro-optic layer 110 is a cell that has a transparent substrate 150 adjacent or facing the second space 104 and a transparent substrate 152 adjacent or facing the first space 102. The substrates may be glass or a flexible or rigid plastic material. On a first surface of the substrate 152 is a semi-reflective coating or layer 112 that acts as the partial reflector. This partial reflector layer 112 may be applied to the substrates itself or be located spaced apart therefrom by one or more plastic or glass layers. Alternatively, the substrate 152 itself may contain a semi-reflective layer. Depending on the material used, the semi-reflective layer may also provide a conducting property.

Each substrate 150, 152 has a coating of a conducting layer 154, 156, respectively, which are typically formed from indium tin oxide, conductive polymer or other appropriate conductive material known in the art if transmissivity is required. If required, an alignment layer (not shown) may be disposed on each conducting layer or on just one of the conducting layers. The alignment layers can align liquid crystal molecules adjacent to the alignment layers, where the molecules are part of the liquid crystal material received between the substrates. In a LC cell, a gap of about 1-100 µm, or in some examples 3-50 µm, or 3-25 µm, or 5-20 µm, or 5-10 µm or any number in between, is typically provided between the substrates and may be maintained by spacers (not shown), as is commonly known in the art. Accordingly, the opposed substrates 150, 152 form a gap which receives the electro-optic material, such as a liquid crystal or electrochromic material or mixture 160. In case of a guest-host electro-optic layer, the mixture 160 will include a liquid crystal material and one or more dichroic dyes. Other examples include: TN, STN, SPD, PDLC, dynamic scattering, CLC and other light management configurations.

The conducting layers 154, 156 allow the application of a voltage across the substrates to activate the electro-optic mixture 160 disposed in between the substrates 150, 152. An edge seal 162 may be needed and provided around or about the outer periphery of the cell so as to retain the electro-optic material 160 between the substrates. In some embodiments, one or both substrates comprise glass or plastic (e.g. polycarbonate, PET, TAC, or other optical grade polymer material).

Each conducting layer 154, 156 is connected to a control circuit (not shown), which typically includes a drive circuit, a power source and an activator. The control circuit applies a voltage and/or voltage waveform in an appropriate manner to switch or activate the electro-optic layer. In the case of a liquid crystal, the voltage changes the orientation of the liquid crystal material to achieve various states, e.g., high transmission, low transmission (opaque), absorption, light-scattering, reflection and states in between. In the case of an electrochromic (EC) device, the electric charge alters the oxidation state of the material, which changes the color and/or optical density of an EC material.

In another embodiment shown in FIG. 2B, the partial reflector 112 is part of the cell as follows: the transparent conductive layer (156 in FIG. 1A) has been replaced with a semi-reflective conductive material 158 that acts as the partial reflector 112. The semi-reflective material can be applied as a coating on the second surface of substrate 152. Such semi-reflective conductive materials are known and include, for example, reflective silver, aluminum, chrome, tin oxide, or the like. In such an arrangement, the switchable electro-optic layer 110 has an integrated partial reflector 112. It should be noted that this layer can be used instead of a transparent conductor or in conjunction with it.

In some embodiments, the one-way mirror is composed of one or more pixels which may allow portions of the one-way mirror to be altered independently from other portions. This will allow placement of a small keyhole if needed.

In some embodiments, a sufficiently rigid carrier or glass window (not shown) may be secured or positioned adjacent one or both substrates. In certain embodiments, combinations of electro-optic layer 110 and partial reflector 112 may be applied (e.g. laminated or adhered) to an already existing window, e.g. placed second a double-pane window, or it can be incorporated into the construction of the window during its manufacture. In yet other embodiments, the above combinations of electro-optic layer 110 and partial reflector 112 may itself be used as a window, with or without an added glass (or plastic) carrier.

FIGS. 3A, 3B and 3C show schematic diagrams of a liquid crystal cell capable of having three states. In this example, the liquid crystal 202 contains a dye that can absorb light 204. With application of different voltage waveforms, the LC molecules can be made to switch between three states: in FIG. 3A a first state allowing maximum transmission of light, in FIG. 3B a second dynamic scattering state that scatters light, and in FIG. 3C a third light absorptive (or tinted) state with no scattering effect. This is one example of a device capable of having three states, but other examples are also contemplated including known devices with focal conic-type scattering, or devices where the LC has opposite anisotropy to that depicted in FIGS. 3A-C. Examples of liquid crystal electro-optic layers capable of having more than two modes, such as a tri-state LC having a light absorptive, light scattering and light transmissive state have also been described elsewhere, for example in U.S. Pat. No. 9,116,370 (Taheri et al.) and US 2015/0323825 (Taheri et al.), the entire contents of which are incorporated herein by reference.

Figure 4:
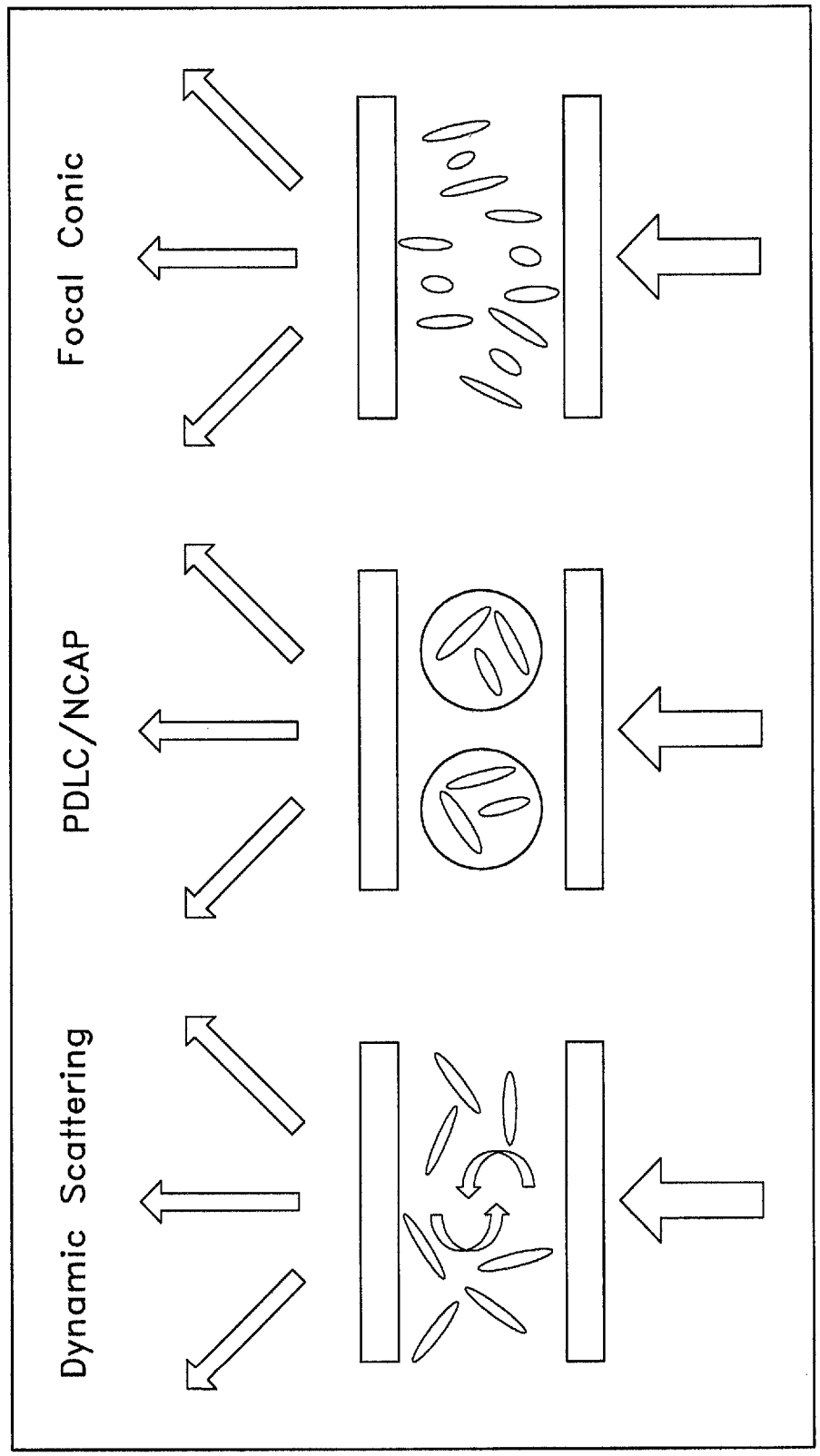
FIG. 4 is a schematic diagram of various forms of light scattering liquid crystals and their molecular orientations.

FIG. 4 is a schematic diagram of various other forms of light-scattering liquid crystals that can be used in the switchable electro-optic layer 110 including systems having a dynamic scattering, a polymer system such as a PDLC or NCAP type of scattering, or a focal conic scattering effect.

FIGS. 5A and 5B are schematic diagrams of one example of a guest-host liquid crystal having a liquid crystal host 210 and guest dye material 212. Dichroic dyes 212 are organic molecules (or mixture of molecules) whose absorption of polarized light strongly depends on the direction of polarization relative to the absorption dipole in the molecule. Depending on the application, the switchable LC cell may have a liquid crystal of negative or positive dielectric anisotropy. The dichroic dye can also have either negative or positive dichroism, depending on the application.

In certain embodiments, as in the example shown in FIGS. 5A and 5B, it is desirable that the switchable LC layer be transmissive when there is no power applied (OFF state in FIG. 5A), and opaque or absorptive when power is applied (ON state in FIG. 5B). This can be obtained where, e.g., the cell has a homeotropic surface treatment for alignment layers in conjunction with a dye having positive dichroism and a liquid crystal material with negative dielectric anisotropy. It is appreciated that it is possible to achieve the same result with a dye having negative dichroism and liquid crystal having a positive dielectric anisotropy.

In other embodiments, it may be desirable to have the reverse be true, i.e. the device be in an opaque state when no voltage is applied and become transmissive upon application of voltage. This can be achieved, for example, by use of a planar surface treatment for alignment layers in conjunction with a dye having positive dichroism and a liquid crystal material with positive dielectric anisotropy. In other embodiments, the result can be achieved by using a dye having negative dichroism with a liquid crystal material with negative dielectric anisotropy Suitable liquid crystals include nematic, chiral nematic or achiral nematic supplemented with a chiral dopant, twisted nematic (TN), STN, etc. and are well known.

Other examples of the switchable electro-optic layer such as PDLC, SPD and Electrochromic devices that can vary the transmission of light through the device are well known in the art and have been described elsewhere.

The partial reflector can be a separate layer or an integral part of the electro-optic layer, as shown above in FIGS. 2A and 2B.

The electronic circuitry used for energizing or activating the electro-optic layer can be operated manually (using a switch), or automatically. One some embodiments, it can also be activated remotely, e.g. via the internet, Bluetooth or other remotely controllable device. In one example, one or more windows having the device of this invention may be wired to a control box with a button for activating the windows. It is also possible to connect the windows to a remote device, such as a computer or mobile phone, so that the one-way mirror may be activated remotely (e.g. by the principal, police, etc.) or automatically upon the occurrence of another event. In some examples, the device can be voice activated.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein, all such combinations and sub-combinations are intended to be within the scope of the present inventions. Still further, while various alternative embodiments as to the various aspects, concepts and features of the inventions—such as alternative materials, structures, configurations, methods, circuits, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention.

The invention claimed is:

1. A switchable one-way mirror device dividing a first space and a second space, said switchable one-way mirror device comprising:
    a switchable electro-optic layer facing the second space configured to be electronically switchable between a transmissive state and one or more partially absorbing states to vary transmission of light; and
    a partial reflector adjacent the switchable electro-optic layer and facing the first space and configured to partially reflect light;
    wherein the switchable one-way mirror device partially transmits a first light going from the first space to the second space, and a second light going from the second space to the first space, and wherein the ratio between the amount of the partially transmitted second light and the amount of the partially reflected first light can be electrically altered such that
    when the switchable electro-optic layer is in the one or more partially absorbing states, the amount of the first light reflected by the switchable one-way mirror device is about the same or more than the amount of the second light transmitted through the switchable one-way mirror device.

2. The device of claim 1, wherein the first space and the second space are interior rooms lit by interior light fixtures such that the first space and the second space are illuminated by approximately a similar amount of lighting.

3. The device of claim 1, wherein the switchable electro-optic layer is in the transmissive state when OFF and in the one or more partially absorbing states when turned ON by application of one or more voltages.

4. The device of claim 1, wherein the switchable electro-optic layer is in the one or more partially absorbing when OFF and in the transmissive state when turned ON by application of a voltage.

5. The device of claim 1, wherein the switchable electro-optic layer comprises an electrochromic mixture.

6. The device of claim 1, wherein the switchable electro-optic layer comprises a liquid crystal mixture selected from: light absorptive, light reflective, light scattering configuration or a combination thereof.

7. The device of claim 6, wherein the liquid crystal mixture comprises a guest-host liquid crystal, a twisted nematic liquid crystal, or a combination thereof.

8. The device of claim 1, wherein the switchable electro-optic layer comprises a cell with one or more substrates selected from plastic substrates, glass substrates, or a combination thereof.

9. The device of claim 1, wherein application of a voltage to the switchable electro-optic layer is controlled manually, automatically, remotely, by voice activation, or any combination thereof.

10. The device of claim 1, wherein the switchable one-way mirror device does not use polarizers and has a non-polarization based function.

11. The device of claim 1, wherein the switchable one-way mirror device further comprises a polarizer.

12. The device of claim 1, wherein the switchable one-way mirror device has multiple pixels each independently operated.

13. The device of claim 1, where the device is applied to or is an integral part of a window separating the first space from the second space.

14. The device in claim 1, wherein the ratio between the amount of the second light transmitted through the switchable one-way mirror device and the amount of the first light reflected by the switchable one-way mirror device can be electrically altered between 0.05 and 4.

15. A method of making it difficult for a viewer in a first space to see a second space, where the first space is lit by a first light and the second space is lit by a second light, the amount of the second light that illuminates the second space is more than or approximately equal to the amount of the first light that illuminates the first space, said method comprising:
    switching a one-way mirror device separating the first and the second space to an ON state, wherein, said one-way mirror device comprises:
    an electronically switchable liquid crystal layer facing the second space configured to be switchable between a transmissive state and a partially absorbing state; and
    a partial reflector adjacent the electronically switchable liquid crystal layer and facing the first space and configured to partially reflect the first light;
    wherein the switching the one-way mirror device to the ON state switches the switchable liquid crystal layer to the partially absorbing state, thereby reducing the amount of the second light being transmitted into the first space to about the same or less than the amount of the first light being reflected by the switchable one-way mirror device, thereby making it difficult for the viewer in the first space to see the second space.

16. The method of claim 15, wherein the first space and the second space are interior rooms in a building.

17. A method of making it easier for a viewer in a first space to see a second space, where the first space is lit by a first light and the second space is lit by a second light the amount of the second light that illuminates the second space is more than or approximately equal to the amount of the first light that illuminates the first space, said method comprising:

switching a one-way mirror device separating the first and the second space to an ON state, wherein, said one-way mirror device comprises:

an electronically switchable liquid crystal layer facing the second space configured to be switchable between a transmissive state and a partially absorbing state; and a partial reflector adjacent the electronically switchable liquid crystal layer and facing the first space and configured to partially reflect the first light;

wherein the switching the one-way mirror device to the ON state switches the switchable liquid crystal layer to the transmissive state, thereby increasing the amount of the second light being transmitted into the first space to be about the same or more than the amount of the first light being reflected by the device, thereby making it easier for the viewer in the first space to see the second space.

18. The method of claim 17, wherein the first space and the second space are interior rooms in a building.

* * * * *